United States Patent
Zhang et al.

(10) Patent No.: US 10,713,769 B2
(45) Date of Patent: Jul. 14, 2020

(54) ACTIVE LEARNING FOR DEFECT CLASSIFIER TRAINING

(71) Applicant: KLA-Tencor Corporation, Milpitas, CA (US)

(72) Inventors: Jing Zhang, Santa Clara, CA (US); Yujie Dong, Newark, CA (US); Brian Duffy, San Jose, CA (US); Richard Wallingford, Forsyth, MO (US); Michael Daino, Clifton Park, NY (US); Kris Bhaskar, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 16/424,431

(22) Filed: May 28, 2019

(65) Prior Publication Data
US 2019/0370955 A1   Dec. 5, 2019

Related U.S. Application Data

(60) Provisional application No. 62/681,073, filed on Jun. 5, 2018.

(51) Int. Cl.
*G06T 7/00* (2017.01)
*G06N 3/08* (2006.01)
(Continued)

(52) U.S. Cl.
CPC .......... *G06T 7/0004* (2013.01); *G06F 17/18* (2013.01); *G06K 9/628* (2013.01); *G06K 9/6253* (2013.01);
(Continued)

(58) Field of Classification Search
CPC ...... G06T 7/0004; G06N 7/005; G06N 20/00; G06N 3/0472; G06N 3/088; G06K 9/6253; G06K 9/628; G06F 17/18
See application file for complete search history.

(56) References Cited

U.S. PATENT DOCUMENTS

| | | |
|---|---|---|
| 5,544,256 A | 8/1996 | Brecher et al. |
| 7,676,077 B2 | 3/2010 | Kulkarni et al. |
| (Continued) | | |

FOREIGN PATENT DOCUMENTS

WO   2017/194281   11/2017

OTHER PUBLICATIONS

Dinh et al., "Density Estimation Using Real NVP," arXiv: 1605.08803, Feb. 27, 2017, 32 pages.
(Continued)

*Primary Examiner* — Ming Y Hon
(74) *Attorney, Agent, or Firm* — Ann Marie Mewherter (57) ABSTRACT

Methods and systems for performing active learning for defect classifiers are provided. One system includes one or more computer subsystems configured for performing active learning for training a defect classifier. The active learning includes applying an acquisition function to data points for the specimen. The acquisition function selects one or more of the data points based on uncertainty estimations associated with the data points. The active learning also includes acquiring labels for the selected one or more data points and generating a set of labeled data that includes the selected one or more data points and the acquired labels. The computer subsystem(s) are also configured for training the defect classifier using the set of labeled data. The defect classifier is configured for classifying defects detected on the specimen using the images generated by the imaging subsystem.

36 Claims, 4 Drawing Sheets

(51) Int. Cl.
| | |
|---|---|
| *G06K 9/62* | (2006.01) |
| *G06N 3/04* | (2006.01) |
| *G06N 7/00* | (2006.01) |
| *G06N 20/00* | (2019.01) |
| *G06F 17/18* | (2006.01) |

(52) U.S. Cl.
CPC ........... *G06N 3/0472* (2013.01); *G06N 3/088* (2013.01); *G06N 7/005* (2013.01); *G06N 20/00* (2019.01)

(56) References Cited

U.S. PATENT DOCUMENTS

| | | | |
|---|---|---|---|
| 7,877,722 | B2 | 1/2011 | Duffy et al. |
| 8,078,552 | B2 | 12/2011 | Kaushal et al. |
| 8,126,255 | B2 | 2/2012 | Bhaskar et al. |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,098,891 | B2 | 8/2015 | Kulkarni et al. |
| 9,222,895 | B2 | 12/2015 | Duffy et al. |
| 9,299,623 | B2 | 3/2016 | Baseman et al. |
| 9,628,506 | B1* | 4/2017 | Han ............... H04L 63/1441 |
| 9,816,939 | B2 | 11/2017 | Duffy et al. |
| 9,916,965 | B2 | 3/2018 | Bhaskar et al. |
| 10,186,026 | B2 | 1/2019 | Karsenti et al. |
| 2004/0156540 | A1 | 8/2004 | Gao et al. |
| 2006/0226865 | A1 | 10/2006 | Gallarda et al. |
| 2010/0138026 | A1 | 6/2010 | Kaushal et al. |
| 2013/0346346 | A1* | 12/2013 | Criminisi ............... G06N 7/005 706/12 |
| 2015/0269195 | A1* | 9/2015 | Aisu ............... G06F 16/212 706/12 |
| 2015/0332167 | A1 | 11/2015 | Kaushal et al. |
| 2016/0189055 | A1 | 6/2016 | Zvitia |
| 2016/0239476 | A1* | 8/2016 | Huang ............... G06F 17/275 |
| 2016/0258879 | A1* | 9/2016 | Liang ............... G01N 21/8806 |
| 2017/0082555 | A1* | 3/2017 | He ............... G06N 20/00 |
| 2017/0193400 | A1 | 7/2017 | Bhaskar et al. |
| 2017/0200265 | A1 | 7/2017 | Bhaskar et al. |
| 2017/0238055 | A1* | 8/2017 | Chang ............... A63F 13/60 725/19 |
| 2017/0352099 | A1* | 12/2017 | Howe ............... G06Q 40/08 |
| 2018/0106732 | A1 | 4/2018 | Plihal et al. |
| 2018/0107928 | A1 | 4/2018 | Zhang et al. |
| 2018/0144241 | A1* | 5/2018 | Liu ............... G06K 9/6262 |
| 2018/0232601 | A1* | 8/2018 | Feng ............... G06T 7/0004 |
| 2018/0285771 | A1* | 10/2018 | Lee ............... G06N 20/00 |
| 2018/0300576 | A1* | 10/2018 | Dalyac ............... G06K 9/6263 |
| 2019/0073568 | A1 | 3/2019 | He et al. |
| 2020/0050936 | A1* | 2/2020 | Edelsten ............... G06F 9/541 |

OTHER PUBLICATIONS

Doersch, "Tutorial on Variational Autoencoders," arXiv:1606.05908, Aug. 13, 2016, 23 pages.

Draxler et al., "Essentially No Barriers in Neural Network Energy Landscape," arXiv: 1803.00885, Feb. 22, 2019, 12 pages.

Gal, "Uncertainty in Deep Learning," PhD. Thesis, Sep. 2016, 174 pages.

Gal et al., "Dropout as a Bayesian Approximation: Representing Model Uncertainty in Deep Learning," arXiv: 1506.02142, Oct. 4, 2016, 12 pages.

Gal et al., "Deep Bayesian Active Learning with Image Data," arXiv:1703.02910v1, Mar. 8, 2017, 10 pages.

Grandvalet et al., "Semi-supervised Learning by Entropy Minimization," Advances in neural information processing systems, Sep. 16, 2004, pp. 529-536.

Guo et al., "Optimistic active learning using mutual information," IJCAI'07 Proceedings of the 20th International Joint Conference on Artificial Intelligence, pp. 823-829, Hyderabad, India, Jan. 6-12, 2007.

Guo et al., "Discriminative Batch Mode Active Learning," NIPS'07 Proceedings of the 20th International Conference on Neural Information Processing Systems, pp. 593-600, Dec. 3-6, 2007.

Houlsby et al., "Bayesian Active Learning for Classification and Preference Learning," arXiv:1112.5745, 17 pages, Dec. 24, 2011.

Hwang et al., "Smart overlay metrology pairing adaptive deep learning with the physics-based models used by a lithographic apparatus," SPIE Proceedings vol. 10587, Optical Microlithography XXXI; 105870B, 7 pages, Mar. 20, 2018.

International Search Report and Written Opinion for PCT/US2019/035272 dated Sep. 20, 2019.

Kingma et al., "Glow: Generative Flow with Invertible 1x1 Convolutions," NeuroIPS 2018, arXiv:1807.03039, Jul. 10, 2018, 15 pages.

Ly et al., "A Tutorial on Fisher Information," arXiv:1705.01064v2, Oct. 17, 2017, 59 pages.

MacKay, "A Practical Bayesian Framework for Backpropagation Networks," Neural Computation, 4(3):448-472, May 1992.

Munirathinam et al., "Predictive Models for Equipment Fault Detection in the Semiconductor Manufacturing Process," IACSIT International Journal of Engineering and Technology, vol. 8, No. 4, pp. 273-285, Aug. 4, 2016.

Neal, "Bayesian Learning for Neural Networks," Ph.D. Thesis, 1994, Dept. of Computer Science, University of Toronto, 195 pages.

Schein et al., "Active Learning for Logistic Regression: An Evaluation," Machine Learning, vol. 68, Issue 3, Oct. 2007, pp. 235-265.

Shridhar et al., "Bayesian Convolutional Neural Networks with Variational Inference," arXiv:1806.05978, Nov. 14, 2018, 8 pages.

U.S. Appl. No. 16/364,140, filed Mar. 25, 2019 by Bhaskar et al.

van den Oord et al., "Pixel Recurrent Neural Networks," arXiv:1601.06759, Aug. 19, 2016, 11 pages.

Weidl et al., "Applications of object-oriented Bayesian networks for condition monitoring, root cause analysis and decision support on operation of complex continuous processes," Computers & Chemical Engineering, Aug. 29, 2005, pp. 1996-2009.

* cited by examiner

ACTIVE LEARNING FOR DEFECT CLASSIFIER TRAINING

BACKGROUND OF THE INVENTION

1. Field of the Invention

The present invention generally relates to methods and systems for performing active learning for training a defect classifier.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Any successful machine learning based inspection process requires a certain amount of training. The training includes selecting one or more parameters used to image (or otherwise generate output for) the specimen and/or selecting one or more parameters used to process the images (or other output) to detect defects on the specimen and/or perform other functions for the specimen. The parameter(s) used to image the specimen may generally be parameters of imaging hardware of an inspection system while the parameter(s) used to process the images may be parameters of a computer system and/or algorithm used to determine useful information about the specimen from the images.

One difficulty in finding appropriate parameters for an inspection process arises from the sometimes tedious and/or difficult nature of finding suitable examples of actual defects on a specimen that can be used to setup the inspection process. For example, the number of actual, interesting defects of interest (DOIs) on a specimen may be relatively small especially compared to the number of nuisance events detected on the specimen. However, finding suitable DOI examples on one or more setup specimens and using those DOI examples to setup an inspection recipe are generally needed to find inspection recipe parameters that can detect those DOIs on other specimens. Therefore, discovering DOIs and/or new DOI types may be relatively difficult, but necessary, for successful inspection process setup.

From an algorithm perspective, some attempts at defect discovery have been built upon tree or random forest defect classification models with heuristic acquisition functions. From a system perspective, all defect discovery attempts have focused on a single tool type, for instance, only one type of inspection tool.

The currently used methods and systems for setting up an inspection process have, therefore, a number of disadvantages. For example, the existing approaches cannot support deep and extensive models (for instance, deep neural networks, convolutional neural networks, etc.), or a combination of models. In another example, the heuristic acquisition functions used in existing approaches have no theoretical foundation and no lower bound performance guarantee. In an additional example, the present nuisance filter model prediction cannot provide uncertainty estimations. In yet another example, the existing approaches are focused on a single tool type, which does not support other tool types such as those described herein.

Accordingly, it would be advantageous to develop systems and methods for performing active learning for training a defect classifier that do not have one or more of the disadvantages described above.

SUMMARY OF THE INVENTION

The following description of various embodiments is not to be construed in any way as limiting the subject matter of the appended claims.

One embodiment relates to a system configured to perform active learning for training a defect classifier. The system includes an imaging subsystem that includes at least an energy source and a detector. The energy source is configured to generate energy that is directed to a specimen. The detector is configured to detect energy from the specimen and to generate images responsive to the detected energy. The system also includes one or more computer subsystems configured for performing active learning for training a defect classifier. The active learning includes applying an acquisition function to data points for the specimen. The acquisition function selects one or more of the data points based on uncertainty estimations associated with the data points. The active learning also includes acquiring labels for the selected one or more data points and generating a set of labeled data that includes the selected one or more data points and the acquired data. The one or more computer subsystems are also configured for training the defect classifier using the set of labeled data. The defect classifier is configured for classifying defects detected on the specimen using the images generated by the imaging subsystem. The system may be further configured as described herein.

Another embodiment relates to a computer-implemented method for performing active learning for training a defect classifier. The method includes performing active learning for training a defect classifier. The active learning includes the applying, acquiring, and generating steps described above. The method also includes the training step described above. Performing the active learning and training the defect classifier are performed by one or more computer subsystems.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for performing active learning for training a defect classifier. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to perform active learning for training a defect classifier. Some of the embodiments described herein are configured for Bayesian deep learning for adaptive sampling in semiconductor inspection and metrology applications.

Deep learning is considered a state-of-the-art solution to supervised learning when a sufficient amount of labeled data (on the order of millions) are economically available. When deep learning meets semiconductor process control applications, challenges arise from how to convert petabyte-level specimen imaging data into a machine learning/deep learning usefully labeled dataset that can be used for the learning process. Due to the uniqueness of every process generation (e.g., new materials, nano-technology, and design rules), the defects' appearance varies a lot from generation to generation, especially in terms of optical/electron beam response. As the previously discovered defects are less relevant, discovering enough defects becomes crucial to model learning.

Unfortunately, defect discovery/sampling are coupled with model training, especially for the first specimen of a new layer (where the term "layer" refers to a series of process steps performed on a specimen or only one of multiple portions of the specimen, each portion resulting from a series of process steps). For example, in semiconductor inspection and metrology systems, the discovery of defect candidates and the creating of the nuisance event filter (NEF) have inter-dependency, i.e., without a trained NEF, it is substantially difficult to perform discovery; without defect candidates, it is also virtually impossible to establish the NEF. Such inter-dependency (i.e., the chicken-egg problem) makes it extremely difficult to solve the two problems independently. One systematic approach to address discovery and training with substantially limited examples is active learning (i.e., adaptive discovery).

Currently used mitigation to the above-described issues may include performing multiple manual loops between inspection and review tools until satisfaction is met or a maximum time has been reached. The human involvement in such loops often adds inconsistency and more importantly limits fine granular optimization. Another alternative is to use a modulated/skewed process to deliberately increase the defect density on the specimen to help the defect sampling. However, these mitigations are not always adequate for the challenges of small sub-10 nm defects or 3D embedded defects.

The embodiments described herein provide a systematic framework (including both algorithm, workflow, and hardware) to support active learning of machine learning models, deep neural networks, and also the complicated combinations of them from the Bayesian perspective, to enable on-the-fly defect discovery and NEF training within one tool or across multiple tools. The embodiments described herein have multiple possible applications described further herein. For example, the embodiments establish possible system-algorithm-unified solutions that may combine a hybrid inspector concept and Bayesian deep learning.

The embodiments described herein provide a number of major improvements that can be applicable to various inspection tools and any other semiconductor process-quality related tools. One such improvement is breaking the inter-dependency between defect sampling and model training for enhanced defect sampling. Another improvement is extending Bayesian deep learning for implementing active learning. An additional improvement is establishing a joint-setup concept for multiple tool components (e.g., an optical inspection tool and a defect review tool) on hybrid inspector.

Figure 1:
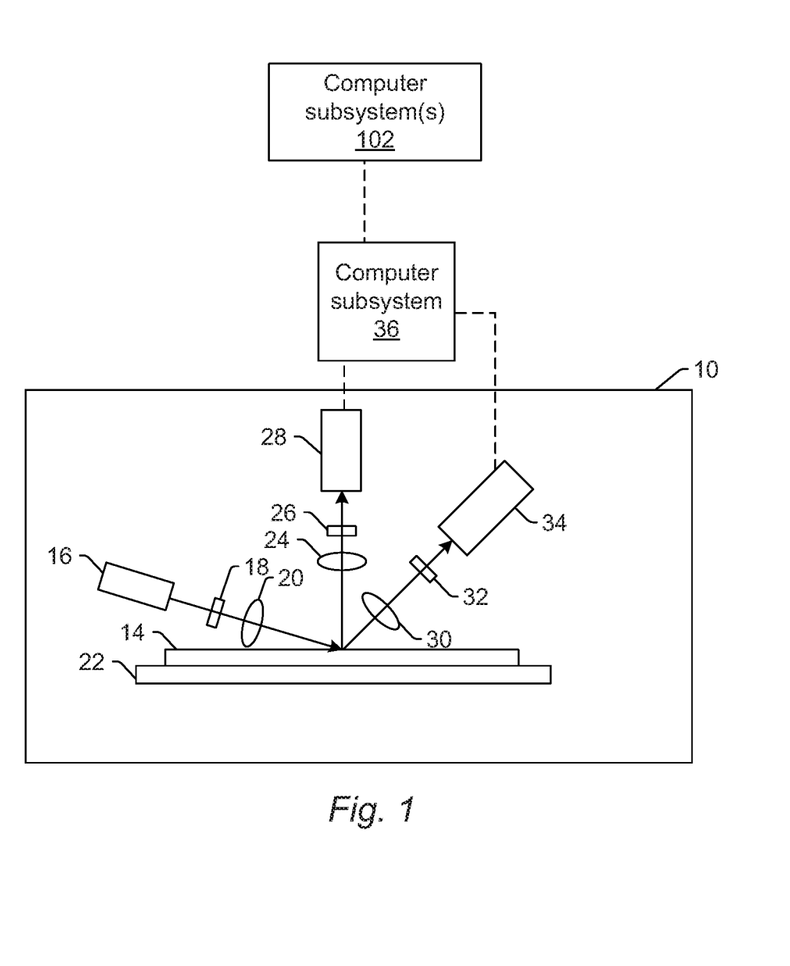
FIGS. 1 and 1a are schematic diagrams illustrating side views of embodiments of a system configured as described herein.

The system includes an imaging subsystem that includes at least an energy source and a detector. The energy source is configured to generate energy that is directed to a specimen. The detector is configured to detect energy from the specimen and to generate images responsive to the detected energy. In one embodiments, the imaging subsystem is configured as an optical inspection subsystem. One embodiment of such a system is shown in FIG. 1.

In one embodiment, the specimen includes a wafer. The wafer may include any wafer known in the art. In one such example, the wafer may be a wafer on which one or more back end packaging process steps have been performed (to assemble multiple chips into advanced packages). In another embodiment, the specimen includes a reticle. The reticle may include any reticle known in the art.

The imaging subsystem generates optical images by directing light to or scanning light over the specimen and detecting light from the specimen. In the embodiment of the system shown in FIG. 1, imaging subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1, and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 is a broadband plasma (BBP) light source. In this manner, the light generated by the light source and directed to the specimen may include broadband light. However, the light source may include any other suitable light source such as any suitable laser known in the art configured to generate light at any suitable wavelength(s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging subsystem may be configured to alter one or more of the elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion such as in a serpentine-like path or in a spiral path.

The imaging subsystem further includes one or more detection channels. At least one of the one or more detection channels includes a detector configured to detect light from the specimen due to illumination of the specimen and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detectors may include photo-multiplier tubes (PMTs), charge coupled devices (CCDs), time delay integration (TDI) cameras, and any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate the images described herein in a number of ways.

It is noted that FIG. 1 is provided herein to generally illustrate a configuration of an optical imaging subsystem that may be included in the system embodiments described herein or that may generate images that are used by the system embodiments described herein. Obviously, the optical imaging subsystem configuration described herein may be altered to optimize the performance of the subsystem as is normally performed when designing a commercial imaging system. In addition, the systems described herein may be implemented using an existing system (e.g., by adding functionality described herein to an existing system) such as the 29xx/39xx series of tools that are commercially available from KLA, Milpitas, Calif. For some such systems, the embodiments described herein may be provided as optional functionality of the system (e.g., in addition to other functionality of the system). Alternatively, the optical imaging subsystem described herein may be designed "from scratch" to provide a completely new optical imaging subsystem.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors for the specimen. Computer subsystem 36 may be configured to perform a number of functions described further herein using the output of the detectors.

The system may also include more than one computer subsystem (e.g., computer subsystem 36 and computer subsystem(s) 102 shown in FIG. 1), which may be configured differently or the same. The computer subsystems shown in FIG. 1 (as well as other computer subsystems described herein) may also be referred to as computer system(s). Each of the computer subsystem(s) or system(s) may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging system, in another embodiment, the imaging subsystem is configured as an electron beam inspection subsystem. For example, the system may also or alternatively include an electron beam imaging subsystem configured to generate electron beam images of the specimen. The electron beam imaging subsystem may be configured to direct electrons to or scan electrons over the specimen and to detect electrons from the specimen. In one such embodiment shown in FIG. 1*a*, the electron beam imaging subsystem includes electron column 122 coupled to computer subsystem 124.

Figure 1A:
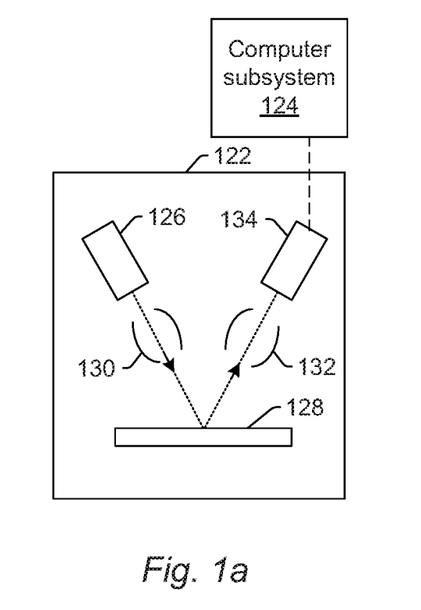

As also shown in FIG. 1*a*, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam imaging subsystem may be configured to use multiple modes to generate images of the specimen as described further herein (e.g., with different illumination angles, collection angles, etc.). The multiple modes of the electron beam imaging subsystem may be different in any image generation parameters of the electron beam imaging subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the electron beam imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam imaging subsystem described herein may be altered to optimize the performance of the imaging subsystem as is normally performed when designing a commercial imaging subsystem. In addition, the systems described herein may be implemented using an existing system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may be any other suitable ion beam imaging subsystem such as those included in commercially available focused ion beam (FIB) systems, helium ion microscopy (HIM) systems, and secondary ion mass spectroscopy (SIMS) systems.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 10 and do not have any capability for handling the physical version of the specimen but may be configured as a virtual inspector that performs inspection-like functions using stored detector output. Systems and methods configured as "virtual" inspection systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, the one or more computer subsystems described herein may be further configured as described in these patents.

As further noted above, the imaging subsystem may be configured to generate images of the specimen with multiple modes. In general, a "mode" can be defined by the values of parameters of the imaging subsystem used for generating images of a specimen or the output used to generate images of the specimen. Therefore, modes that are different may be different in the values for at least one of the imaging parameters of the imaging subsystem. For example, in an optical imaging subsystem, different modes may use different wavelengths of light for illumination. The modes may be different in illumination wavelengths as described further herein (e.g., by using different light sources, different spectral filters, etc.) for different modes. In another embodiment, different modes use different illumination channels of the imaging subsystem. For example, as noted above, the imaging subsystem may include more than one illumination channel. As such, different illumination channels may be used for different modes.

The imaging subsystems described herein may be configured as inspection subsystems. If that is the case, the computer subsystem(s) may be configured to receive the output from the inspection subsystem as described above (e.g., from detector(s) of the imaging subsystem) and may be configured to detect defects on the specimen based on the output in any suitable manner. For example, the computer subsystem(s) may be configured to compare the output to one or more thresholds, any output that is above the one or more thresholds may be identified by the computer subsystem(s) as defects or potential defects, and any output that is not above the one or more thresholds may be identified by the computer subsystem(s) as not defects or not potential defects. However, the computer subsystem(s) may be configured to use any suitable algorithm(s) and/or method(s) to detect defects on the specimen based on the output.

In one embodiment, the imaging system is an inspection subsystem. In this manner, the systems described herein may be configured as inspection systems. However, the systems described herein may be configured as another type of semiconductor-related process/quality control type system such as a defect review system and a metrology system. For example, the embodiments of the imaging subsystems described herein and shown in FIGS. 1 and 1a may be modified in one or more parameters to provide different imaging capability depending on the application for which they will be used. In one embodiment, the imaging subsystem is configured as an electron beam defect review subsystem. For example, the imaging subsystem shown in FIG. 1a may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

The computer subsystem(s) are configured for performing active learning for training a defect classifier. The active learning includes applying an acquisition function to data points for the specimen. The acquisition function selects one or more of the data points based on uncertainty estimations associated with the data points. The data points may include a variety of different data for the specimen depending on, for example, the defect classifier that the selected one or more data points will be used to train. For example, the data points may include raw output generated for the specimen by the detector and/or some information determined from the raw output such as detected events (where "detected events" are defined as any events detected on the specimen as a potential defect, which can be separated as described further herein into actual defects and DOIs and nuisances or "nuisance events"), which may be detected as described herein, one or more characteristics of the output (e.g., intensity values) corresponding to the detected events, one or more characteristics of the detected events (e.g., size, shape, etc.) determined from the raw output. The information determined from the raw output may be determined in any suitable manner known in the art.

The data points to which the acquisition function is applied in the applying step may also include data points for one or more specimens. For example, as described herein, the embodiments are particularly useful for finding new defect types and for performing the steps with relatively few defect or DOI examples. However, when defect densities are substantially low on a specimen type, data points for multiple specimens of the same type can be used by the embodiments described herein to get even the relatively small number of examples required and/or simply to increase the available data points. In this manner, the likelihood that the embodiments described herein will be able to generate a suitable defect classifier for low defect density scenarios can be improved.

Figure 2:
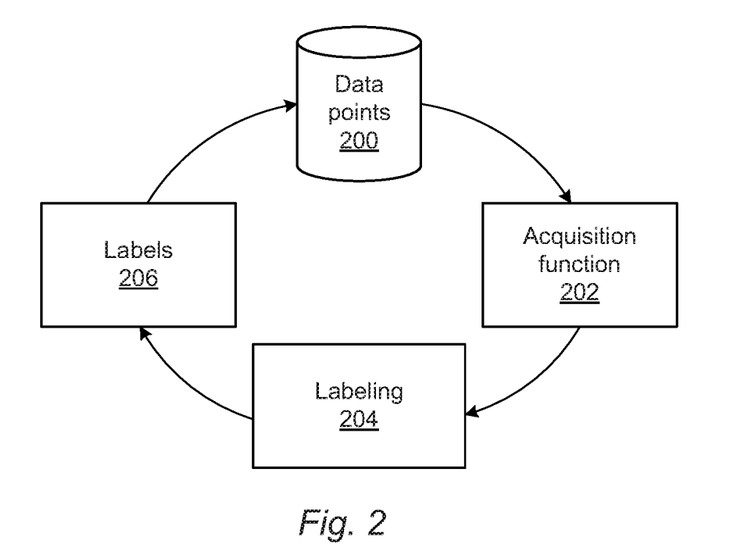
FIGS. 2 and 3 are flow charts illustrating steps that may be performed by the embodiments described herein.

As shown in FIG. 2, in one embodiment, data points 200 may be input to acquisition function 202. At the beginning of the process (in the first step of the first iteration), data points 200 may be considered the initial data to which results of one or more steps described herein may be added to thereby generate a dataset that includes at least some labeled data points. In one embodiment, the data points for the specimen consist of unlabeled data points. For example, the initial data may include no ground truth data (where "ground truth data" is generally defined as data that has been generated by a "ground truth" method such as a defect review process that is performed using a defect review tool capable of resolving images of the defects and/or user-provided information such as manual defect classifications). In another embodiment, the data points for the specimen include a combination of fewer than ten ground truth data points for any one defect type and unlabeled data. For example, the initial data may include more than one defect data points. In one particular example, the data points may include only 1 or 2 labeled examples of any one defect type, possibly with 1 or 2 labeled examples of multiple defect types (e.g., 1 or 2 bridge defects, 1 or 2 particle defects, 1 or 2 3D embedded defects, and so on). In this manner, the workflow can start from either (1) no ground truth data, i.e., a pool of unlabeled data, or (2) a few (>1) ground truth data optionally in combination with a pool of unlabeled data.

An objective of the adaptive discovery loop shown in FIG. 2 is to dynamically decide the candidate(s) to be verified based on the present "known" data, which may be performed as described further herein. For example, as shown in FIG. 2, acquisition function 202 is used to decide the batch of unknown candidates that are sent to labeling 204 next, which may be performed by a verifier to be verified. Labeling may include one or more of the ground truth methods described herein.

In one embodiment, the acquisition function is configured to select the one or more of the data points that have the highest uncertainty of being any known defect type. For example, the acquisition function may be configured to select data points having the highest uncertainties of being any known defect type so that those data points can be sent for verification (labeling) as described further herein. By selecting the highest uncertainty data points for verification or labeling and then using those labeled data points for defect classifier training as described herein, the resulting trained defect classifier will have better performance for the function it is configured for (i.e., by selecting and then verifying the highest uncertainty data points and then training the defect classifier with those labeled data points, the uncertainty in the data points that may be input to the defect classifier can be essentially "trained out" of the defect classifier thereby rendering it capable of correctly classifying those previously uncertain data points). Depending on the type of acquisition function used in the embodiments described herein, the acquisition function can be configured to select the data points having the highest uncertainty of any known defect type as described further herein.

In some embodiments, the acquisition function is defined as an adaptive sampling method, some suitable examples of which are described in U.S. Pat. No. 9,098,891 to Kulkarni et al., which is incorporated by reference as if fully set forth herein. The embodiments described herein may be further configured as described in this patent. The embodiments described herein may establish a (machine) learning-based approach to render an original rule based method capable of adaptive sampling on smaller design rules with higher process variations. The net result is better generalizability across multiple design rules and higher sampling efficiency under higher process variations (e.g., noise). The sampling may be adaptive in any other suitable manner (e.g., it may vary depending on the initial data points (or characteristics determined thereof) rather than some predetermined rules, it may vary depending on the labels produced as a result of labeling 204, etc.).

Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The embodiments described herein may also perform adaptive labeling on deep learning/machine learning training datasets. In one example, the embodiments enable on-the-fly image labeling (i.e., marking the defects at pixel level accuracy for a semiconductor image) with the deep learning classification/detection model. This solution enables faster time-to-recipe-creation for new specimens or new design rules, which reduces recipe setup cost and enables relatively fast design of experiments and increases the value of the tool.

In one embodiment, the acquisition function is defined as an unsupervised sampling method. For example, some possible methods to define the acquisition function are random (or weighted random) sampling and diversity sampling. Random (or weighted random) sampling may be performed in any suitable manner known in the art. Diversity sampling may include selecting two or more of the data points that are the most diverse (most different) in some manner (e.g., most diverse in a characteristic of the data points, which may include any suitable characteristic of the data points). The unsupervised sampling method may be unsupervised in that the data points that are being sampled are not labeled and/or the sampling is not performed based on any labels that are available for the data points being sampled.

In another embodiment, the acquisition function is defined as a supervised sampling method. For example, some possible methods to define the acquisition function include supervised methods such as random forest, nearest neighbor, support vector machine (SVM), etc. Such supervised methods may be performed in any suitable manner known in the art. In an additional embodiment, the acquisition function is defined as a semi-supervised sampling method. In a further embodiment the acquisition function is defined as a combination of a supervised and unsupervised sampling method. For example, the acquisition function may be defined as a semi-supervised or combined method, which may include any such suitable method known in the art performed in any suitable manner known in the art.

In one embodiment, the acquisition function is defined as a sampling method based on Maximum Entropy. For example, one possible method to define the acquisition function is uncertainty sampling such as Maximum Entropy. In this manner, the acquisition function may be implemented via entropy. Maximum Entropy may include evaluating a number of different probability distributions for any data set such as the set of data points described herein to find the probability distribution that has the maximum entropy (the largest uncertainty). The probability distributions may include any suitable probability distributions, and Maximum Entropy may be performed in any suitable manner known in the art. Sampling based on Maximum Entropy may include sampling the data points based on the probability distribution having the largest entropy.

In another embodiment, the acquisition function is defined as a sampling method based on Bayesian Active Learning. For example, the acquisition function may be defined as a Bayesian method. One possible method for defining the acquisition function is Bayesian Active Learning by Disagreement (BALD). Some examples of BALD that may be used to define the acquisition function used in the embodiments described herein are described in "Bayesian Active Learning for Classification and Preference Learning," Houlsby et al., arXiv:1112.5745, 2011, which is incorporated by reference as if fully set forth herein. In this manner, the acquisition function may be implemented via BALD.

In some embodiments, the acquisition function is defined as an Error Reduction method. For example, one possible method for defining the acquisition function is through Error Reduction such as Expected Error Reduction, Maximum Error Reduction, and Combined Error Reduction. Error Reduction generally involves choosing the data point that maximizes the reduction in the total predicted label entropy. Expected Error Reduction generally involves estimating how much a generalization error is likely to be reduced, which may involve estimating the expected future error of a model (trained using a labeled dataset) when applied to an unlabeled dataset, and finding the instance with minimal expected future error loss. Maximum Error Reduction may be performed as described in "Optimistic active learning using mutual information," Guo et al., IJCAI'07 Proceedings of the 20th International Joint Conference on Artificial Intelligence, pages 823-829, Hyderabad, India, Jan. 6-12, 2007, which is incorporated by reference as if fully set forth herein. Combined Error Reduction may be performed as described in "Discriminative Batch Mode Active Learning," Guo et al., NIPS'07 Proceedings of the 20th International Conference on Neural Information Processing Systems, pages 593-600, Dec. 3-6, 2007 and "Semi-supervised Learning by Entropy Minimization," Grandvalet et al., Advances in neural information processing systems, Sep. 16, 2004, pp. 529-553, which are incorporated by reference as if fully set forth herein. The Error Reduction methods may also be performed in any other suitable manner known in the art.

In another embodiment, the acquisition function is defined as a Variation Reduction method. For example, one possible method for defining the acquisition function is through Variation Reduction such as Fisher Information and Expected Variance Reduction. In this manner, the acquisition function may be implemented via variation reduction. In statistics, Fisher Information is a method for measuring the amount of information that an observable random variable carries about an unknown parameter of a distribution that models the variable. Fisher Information is the variance of the score, or the expected value of the observed information. More information on Fisher Information can be found in "A Tutorial on Fisher Information," Ly et al., arXiv:1705.01064v2, Oct. 17, 2017, 59 pages, which is incorporated by reference as if fully set forth herein. The embodiments described herein may be further configured as described in this reference. Expected Variance Reduction can be performed as described in "Active Learning for Logistic Regression: An Evaluation," Schein et al., Machine Learning, Volume 68, Issue 3, October 2007, pp. 235-265, which is incorporated by reference as if fully set forth herein. The embodiments described herein may be further configured as described in this reference. The Variation Reduction methods may also be performed in any other suitable manner known in the art.

In some embodiments, the acquisition function is defined as a deep learning model. For example, the Bayesian Model supports deep neural networks (including convolutional neural networks (CNNs), recurrent neural networks (RNNs), a long short-term memory (LSTM), which is an artificial RNN architecture used in the field of deep learning that unlike standard feedforward neural networks has feedback connections, generative adversarial networks (GANs), which are deep neural network architectures that include two networks pitted against each other, deep generative models, etc.). The deep neural networks may have any suitable configuration known in the art.

Neural networks can be generally defined as a computational approach which is based on a relatively large collection of neural units loosely modeling the way a biological brain solves problems with relatively large clusters of biological neurons connected by axons. Neural networks typically consist of multiple layers, and the signal path traverses from front to back. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

In an additional embodiment, the acquisition function is defined as a machine learning model. For example, the Bayesian Model supports machine learning models (including tree, random forest, support vector machine (SVM), etc.). The Bayesian Model also supports combinations of the above models (especially cascading models, ensemble models, boosting models, etc.). These machine learning models may have any suitable configuration known in the art.

The embodiments may also use multiple, different acquisition functions in the same system, and each of the acquisition functions may involve multiple Bayesian deep learning/machine learning models or (non-Bayesian) generative deep learning/machine learning models.

A "generative" model can be generally defined as a model that is probabilistic in nature. In other words, a "generative" model is not one that performs forward simulation or rule-based approaches. Instead, as described further herein, a generative model can be learned (in that its parameters can be learned) based on a suitable training set of data. A generative model may be configured to have a deep learning architecture in that the generative model may include multiple layers, which perform a number of algorithms or transformations. The number of layers included in a generative model may be use case dependent. For practical purposes, a suitable range of layers is from 2 layers to a few tens of layers.

In another embodiment, applying the acquisition function includes estimating the acquisition function by evaluating one or more probability distributions using a Bayesian learning model. In one such embodiment, the Bayesian learning model is a Bayesian deep learning model. In another such embodiment, the Bayesian learning model is a Bayesian machine learning model. For example, Bayesian deep learning/machine learning models may be utilized to evaluate the acquisition function (to compute expected value on probability distribution that involves model posterior). In addition, the estimation of the acquisition function may include the evaluation of one or more of the following probability distributions using Bayesian Deep Learning or Bayesian Machine learning models. In this manner, the embodiments may include a Bayesian Model which estimates the prediction uncertainty on unlabeled data. The uncertainty can be expressed by Normal distribution, Bernoulli distribution, etc. The Bayesian Deep Learning or Machine Learning models may also have any other suitable configuration known in the art.

In a further such embodiment, the one or more probability distributions include an unsupervised estimation of sample probability of one or more of the images generated by the imaging subsystem. For example, the one or more probability distributions may include an unsupervised estimation of sample probability p(X), where X is the input image via either a variational autoencoder (VAE), Pixel Convolutional Neural Network (PixelCNN), Pixel Recurrent Neural Network (PixelRNN), real-valued non-volume preserving (RealNVP) transformation, or "Glow."

VAEs are configured for reconstructing output from input and include an encoder and a decoder, which encode and decode the data, respectively. The encoder generates a compressed representation of the output data while the decoder learns to reconstruct the initial input data using the compressed representation as input. The decoder portion of a VAE can be used as a generative model which is able to generate specific features. Additional information on VAEs can be found in "Tutorial on Variational Autoencoders," Doersch, arXiv:1606.05908, Aug. 13, 2016, 23 pages, which is incorporated by reference as if fully set forth herein. The embodiments described herein may be further configured as described in this reference.

PixelCNN is an architecture that is a fully convolutional network of layers that preserves the spatial resolution of its input throughout the layers and outputs a conditional distribution at each location. A PixelRNN includes fast LSTM layers that use LSTM units in their state and adopt a convolution to compute at once all the states along one of the spatial dimensions of the data. Examples of PixelCNNs and PixelRNNs that can be used in the embodiments described herein are included in "Pixel Recurrent Neural Networks," van den Oord et al., arXiv:1601.06759, Aug. 19, 2016, 11 pages, which is incorporated by reference as if fully set forth herein. Examples of RealNVP transformations that can be used in the embodiments described herein are described in "Density Estimation Using Real NVP," Dinh et al., arXiv:1605.08803, which is incorporated by reference as if fully set forth herein. Examples of Glow that may be used in the embodiments described herein are described in "Glow: Generative Flow with Invertible 1×1 Convolutions," Kingma et al., NeuroIPS 2018, arXiv:1807.03039, Jul. 10, 2018, 15 pages, which is incorporated by reference as if fully set forth herein.

In another such embodiment, the one or more probability distributions include a supervised or semi-supervised estimation of model posterior and its derived uncertainty distribution. For example, the one or more probability distributions may include a supervised or semi-supervised estimation of model posterior p(w|D) and its derived uncertainty distribution, where w are the model parameters, D is the labeled dataset for supervised methods, and D is the labeled and unlabeled dataset for the semi-supervised case. Such estimation can be performed based on Stochastic Dropout such as that described in "Dropout as a Bayesian Approximation: Representing Model Uncertainty in Deep Learning," Gal et al., arXiv:1506.02142, which is incorporated by reference as if fully set forth herein. Such estimation can also be performed based on a Bayesian Neural Network such as that described in "A Practical Bayesian Framework for Backpropagation Networks," MacKay, Neural Computation, 4(3), 448-472, 1992 and "Bayesian Learning for Neural Networks," Neal, Ph.D. Thesis, Dept. of Computer Science, University of Toronto, 1994, which are incorporated by reference as if fully set forth herein. In addition, such estimation can be performed based on Variation Inference such as a Bayesian CNN, suitable examples of which are described in "Bayesian Convolutional Neural Networks with Variational Inference," Shridhar et al., arXiv:

1806.05978, Nov. 14, 2018, 8 pages, which is incorporated by reference as if fully set forth herein. Furthermore, such estimation may be performed based on Markov Chain Monte Carlo (MCMC), which may be performed in any suitable manner known in the art. The methods described above can be used with a deep learning model (e.g., CNN) and machine learning models (e.g., Random Forest, SVM) to perform uncertainty sampling, error reduction sampling, and variational reduction sampling described above to perform the acquisition step.

In general, active learning can be viewed as involving one robot and one teacher, where the robot performs semi-supervised learning by conductively querying samples from the current least information regions (CLIRs) to the teacher. This scheme can be applied to defect sampling by defining the robot as a "smart" detection/classification algorithm and the teacher as a review tool or another ground truth method or system. A difficulty of implementing active learning schemes can arise from how to define the CLIRs for a supervised learning algorithm, especially deep learning.

The embodiments described herein incorporate the Bayesian concept for identifying CLIRs. These solutions often start with the estimation of model posterior $p(\omega|D)$ and the expectation of model prediction can then be computed by:

$$E[y|x,\omega]=\int p(y|x,\omega)p(\omega|D)d\omega.$$

The estimation of model posterior of a deep neural network is generally believed to be intractable. The practical approaches to crudely estimate the model posterior include model ensemble, stochastic dropout, variational inference, MCMC, etc.

Figure 3:
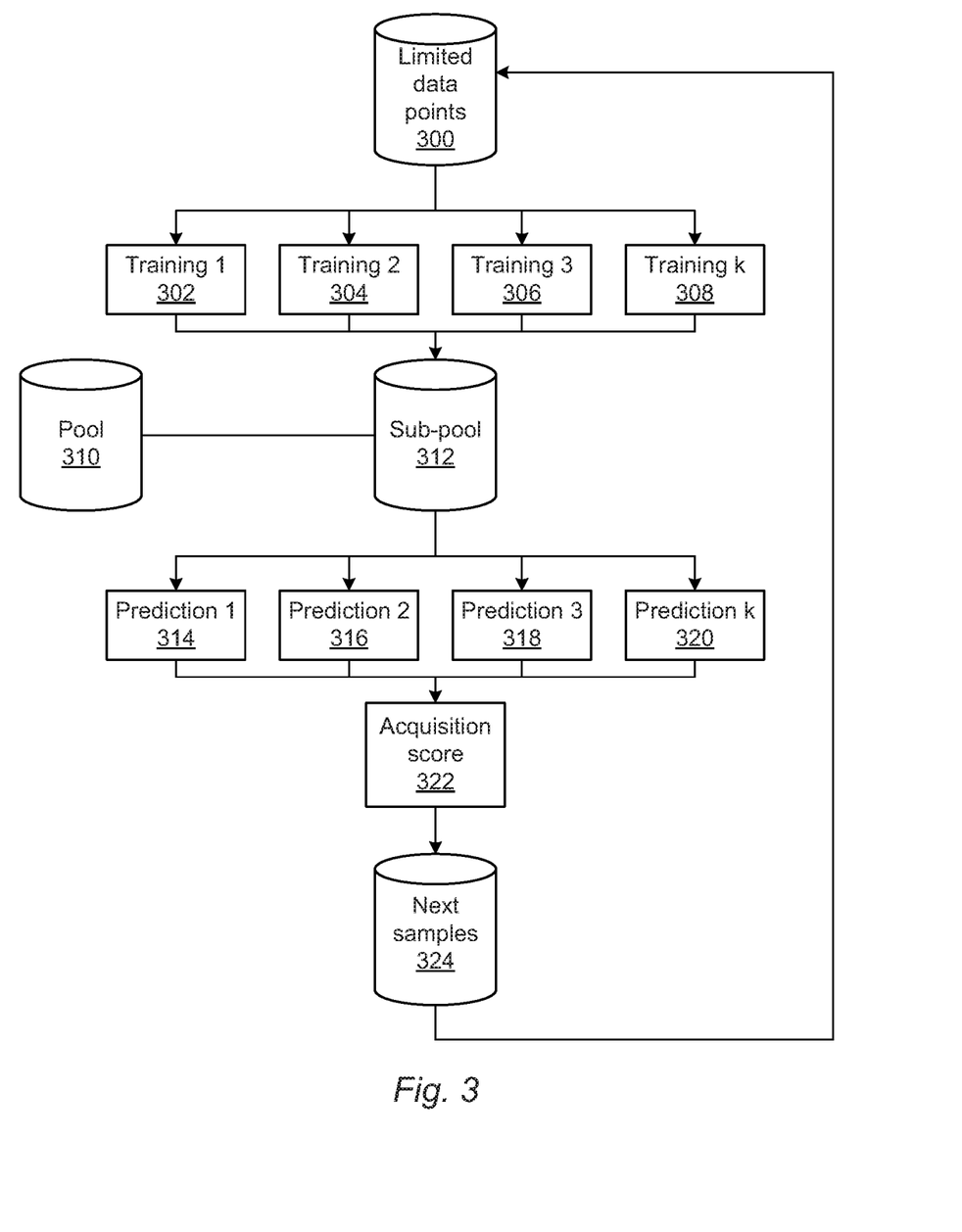

FIG. 3 illustrates one embodiment of steps that may be performed for Bayesian Deep Learning (BDL) and Active Discovery. In this embodiment, the BDL is used to estimate CLIRs. This framework employs both model ensemble and stochastic dropout concepts to approximate expectation of model prediction upon implicitly learned model posterior. This figure presents the workflow for a single BDL acquisition iteration, which includes the following steps. Starting with substantially limited labeled data, e.g., limited data points 300, the computer subsystem(s) train one or multiple models (any model including a deep neural network), which allows the prediction to generate an uncertainty estimation. The limited data points may include, for example, only 1 or 2 DOI examples (in total or per defect class). For example, as shown in FIG. 3, limited data points 300 may be input to Training 1 302, Training 2 304, Training 4 306, . . . , Training k 308. These trainings may include multiple independent trainings. The trainings may be performed in any suitable manner known in the art.

BDL can also be used in the situation where there is completely no labeled data by incorporating any unsupervised sampling or detection algorithm at bootstrap. Once a few (at least one) defects are identified, BDL can start to enhance the defect sampling and model learning.

Optionally, the computer subsystem(s) may generate sub-pool 312 of unlabeled data from pool 310 of data. The sub-pool of data may be generated using different methods such as random sampling, diversity sampling, unsupervised algorithms, e.g., autoencoder and its variants, GAN, etc., and outlier detection algorithms. The computer subsystem(s) may then apply the model(s) on the sub-pool of data. For example, as shown in FIG. 3, sub-pool 312 of data may be input to Prediction 1 314, Prediction 2 316, Prediction 3 318, . . . , Prediction k 320. These predictions may be performed by running inference of each model on the sub-pool data set.

The inferences may be performed with stochastic dropout to estimate CLIRs, i.e., acquisition score 322. Variational inference and MCMC can also be applied. The CLIRs are generally quantified by the uncertainty definition in information theory such as entropy via:

$$H[y|x,D]=-\Sigma_c p(y=c|x,D)\log p(y=c|x,D);$$

or more advanced metrics such as BALD via:

$$I[y|x,D]=H[y|x,D]-E_{p(\omega|D)}[H[y|x,\omega]].$$

Intuitively, these metrics are intended to identify the data points either located on current decision boundaries (i.e., ambiguous data points) or regions with no data support (i.e., unseen).

The embodiments described herein may therefore perform training and inference for multiple models. The multiple models may also be referred to as an "ensemble of models," i.e., computing ensemble expectations across multiple models' predictions. The ensemble of a relatively small number of (deep learning) models can reasonably approximate the model posterior because the barriers on the loss landscape are negligible. The advantages of this approach include that (a) it permits the use of different models, (b) it provides the asymptotic correct result when the number of models goes infinite or the model distribution follows the model posterior, and (c) it also provides the freedom to adapt the model choice for the tool's computational model and cost requirements.

Different Bayesian Models can be used in the same acquisition function. For example, in FIG. 3, there are multiple vertical branches to illustrate multiple trainings on (possibly) different models. Each of the branches can be a different model, each of the branches can be the same model, or some of the branches can be a different model and others of the branches can be the same models. The training and inference in the same branch will share the same model though, i.e., the model used in training 1 and prediction 1 should be the same; the model used in training 1 (prediction 1) can be different than the model used in training 2 (prediction 2), and so on.

The computer subsystem(s) also compute the acquisition function (e.g., BALD) to identify the data points that have the highest uncertainty. For the Bayesian model to estimate the prediction uncertainty, it may estimate the posterior of model probability p(w|x). This can be performed by variational inference, MCMC, MC Dropout, etc. There are several choices of acquisition function to incorporate both data uncertainty and model uncertainty. For example, deep learning can handle data uncertainty using design context, inspection-to-design alignment, and/or noise segmentation. In one such example, the deep learning estimated uncertainty can be used to perform design space noise segmentation or generating care areas. Design space noise segmentation and generating care areas may be performed using the deep learning estimated uncertainty described herein in the systems and methods described in U.S. Pat. No. 7,676,077 by Kulkarni et al. issued Mar. 9, 2010 and U.S. Pat. No. 7,877,722 by Duffy et al. issued Jan. 25, 2011, which are incorporated by reference as if fully set forth herein. The embodiments described herein may be further configured as described in these patents. In addition, deep learning can handle model uncertainty via model averaging (ensemble of models) and/or MC dropout, i.e., stochastic evaluations.

Computing the acquisition function may generate acquisition score 322. In this embodiment, the collective model uncertainty across multiple models or multiple instances is applied to derive/calculate an acquisition function (e.g., BDL). The computer subsystem(s) may further obtain the labels for the data points identified as having the highest uncertainty from imaging tools. Next samples 324 may then be added to limited data points 300 as described further herein. In this manner, the computer subsystem(s) may compute acquisition scores and decide the next batch of samples. The embodiments may also perform defect review (e.g., SEM review), aggregate the defect review results to the training data set, and remove the defect reviewed samples from the pool. The approach shown in FIG. 3 can be viewed as semi-supervised learning and active learning.

The active learning also includes acquiring labels for the selected one or more data points. In one embodiment, acquiring the labels includes classifying the selected one or more data points using a ground truth method. For example, the unknown candidates selected by the acquisition function can be sent to labeling 204 shown in FIG. 2, which may be performed by a verifier such as a review or inspection tool that obtains the defect type of the selected candidates. In addition, the selected unlabeled candidates may be verified and labeled through a review or inspection tool (via optical, scanning electron microscope (SEM), or other means), through a customer database to obtain the defect labels, from a user who manually assigns the labels, or any other suitable ground truth method or system. In one such embodiment, acquiring the labels includes classifying the selected one or more data points through human input (e.g., human interaction and/or labeling). The human interaction and/or labeling may be enabled in any suitable manner known in the art.

In another embodiment, acquiring the labels includes classifying the selected one or more data points through a crowd sourcing method. "Crowdsourcing" in the context of the embodiments described herein is generally defined as a method in which the labels are acquired from a relatively large, somewhat open and possibly evolving group of participants thereby dividing work between participants to achieve a cumulative result. The crowdsourcing may otherwise be performed in any suitable manner known in the art.

In a further embodiment, acquiring the labels includes classifying the selected one or more data points through physics simulation. "Physics simulation" as that term is used herein refers to a simulation of the effects that an event corresponding to the data points (a defect or potential defect) will have on one or more of the physical (including electrical and/or material) characteristics of the specimen or a device being formed on or with the specimen. The results of the physics simulation can then be used to determine an appropriate label for any selected data point (e.g., defect, type of defect, nuisance, type of nuisance, etc.). The physics simulation may be performed using an empirically trained process model that may be used to generate a simulated specimen such as SEMulator 3D, which is commercially available from Coventor, Inc., Cary, N.C. In this manner, the physics simulation may be performed to simulate what a specimen for which the data points were generated will look like in specimen space (not necessarily what such a specimen would look like to an imaging system). Therefore, the physics simulation may generate a simulated representation of the specimen that represents what the specimen would look like in 2D or 3D space of the specimen.

The defect type information may therefore be the labels that are acquired in this step. Labels 206 shown in FIG. 2 may be produced by labeling 204. The labels may have any suitable format known in the art.

The active learning further includes generating a set of labeled data that includes the selected one or more data points and the acquired labels. Generating the set of labeled data may include generating a new set of labeled data that is different from the set of data from which the data points were selected. Alternatively, generating the set of labeled data may include adding the selected data point(s) and their associated labels to the data set from which the data points were selected. The generated set of labeled data may have any suitable format known in the art.

In one embodiment, the active learning includes repeating at least once a sequence of steps that includes the applying, acquiring, and generating steps, and the generating step performed in the sequence of steps includes appending the labels, which are acquired for the one or more data points selected in the applying step performed in the sequence of steps to the set of labeled data. For example, as shown in FIG. 2, labels 206 may be sent back to data points 200 to thereby append the labels to the dataset after which the steps shown in FIG. 2 may be repeated. In this manner, the new labeled data is appended to the initial data set and the loop may be continued as desired. As such, as the labels are acquired for different data points selected in different applying steps, the labels and their data points may be accumulated in a single data set by repeatedly adding the labels and their data points to the initial data set or the data set created after the first iteration. The number of iterations of the steps in the loop that are performed by the embodiments described herein may be limited in a number of ways such as a maximum, predetermined number of iterations (which may be established from a practicality standpoint), a desired, predetermined characteristic of the labeled data points (such as a predetermined minimum number of examples of certain (or all) DOI types), by user feedback based on results of any of the steps described herein, the acquisition score itself or a property of the acquisition score (such as change in the acquisition score from run-to-run), or some combination thereof.

The computer subsystem(s) are also configured for training the defect classifier using the set of labeled data. The defect classifier is configured for classifying defects detected on the specimen using the images generated by the imaging subsystem. Training the defect classifier using the set of labeled data may be performed in any suitable manner known in the art (e.g., by inputting the data points into the defect classifier and modifying one or more parameters of the defect classifier until the output of the defect classifier for the input data points matches the labels acquired for the data points). The defect classifier may include any of the defect classifiers described herein.

In one embodiment, the defect classifier is configured as a nuisance event filter (NEF). The NEF may simply be configured to separate nuisance events from any other type(s) of events thereby producing a set of defects that may include multiple defect types. The output of the NEF filter may then be input to a defect classifier that classifies the non-nuisance events and/or the output of the NEF filter may be used as the inspection results. The NEF may have any suitable configuration known in the art. In this manner, the embodiments described herein may be configured for NEF training. By combining the merits of deep learning and active learning, the embodiments described herein can provide a systematic solution for NEF training under different tool setups.

In some embodiments, the defect classifier is configured as a defect detector. In this case, the defect classifier may essentially function as a detected event classifier in that it may classify (and therefore detect) any events detected by a defect detection method and/or algorithm into defects or nuisances. A defect classifier that is configured as a defect detector may also perform defect classification and nuisance filtering as described further herein. Some examples of defect classifiers that may also perform defect detection and are machine learning based are described in U.S. Patent Application Publication No. 2019/0073568 published Mar. 7, 2019 by He et al., which is incorporated by reference as if fully set forth herein. Some examples of machine learning based defect detectors are described in U.S. Pat. No. 10,186,026 issued Jan. 22, 2019 by Karsenti et al., which is incorporated by reference as if fully set forth herein. The embodiments described herein may be further configured as described in these references. The defect detector may also be a non-machine learning defect detector.

In a further embodiment, the defect classifier is configured as an automatic defect classifier. The automatic defect classifier may have any suitable configuration and format known in the art. In addition, the automatic defect classifier may include both machine-learning or non-machine learning defect classifiers. Other defect classifiers described herein may also be automatic defect classifiers in that once they are setup and trained, they may classify defects automatically (without user input).

In another embodiment, the defect classifier is configured as a multi-class classifier. For example, the acquisition functions described herein support multi-class classification. The multi-class classifier may have any suitable configuration known in the art. The multi-class classifier may separate the defects into different classes (hence the multi-class nomenclature), which may include different classes like bridges, particles, missing features, scratches, and the like. The different defect classes may be identified or labeled in any suitable manner (simply by numbers or with names). The multi-class classifier may also separate different types of DOIs from nuisances. For example, the multi-class classifier may include a bin for nuisance events thereby acting both as a defect classifier and a nuisance filter.

The defect classifier that is trained by the embodiments described herein may include deep learning/machine learning defect classifiers or any other type of defect classifier. For example, the defect classifier may be a simple decision tree type defect classifier with appropriate cutlines for separating detected events into different bins associated with different defect types (and possibly a nuisance bin). However, the defect classifier may have a deep learning/machine learning architecture such as those described in U.S. Patent Application Publication Nos. 2018/0107928 published Apr. 19, 2018 by Zhang et al. and 2019/0073568 published Mar. 7, 2019 by He et al., which are incorporated by reference as if fully set forth herein. The computer subsystem(s) may be configured to train the defect classifier as described in U.S. Patent Application Publication Nos. 2017/0193400 published Jul. 6, 2017 by Bhaskar et al. and 2018/0107928 published Apr. 19, 2018 by Zhang et al., which are incorporated by reference as if fully set forth herein. The embodiments described herein may be further configured as described in these publications.

In some embodiments, the acquisition function is configured to select the one or more of the data points that have the highest probability of being new defect types. For example, the parameters of the acquisition function may be selected so that the acquisition function preferentially selects (selects first or more heavily from) previously unseen data points (data points that are unlike any other previously seen data points for similar specimens in that they have one or more characteristics not previously seen), data points that are outliers with respect to the entire data point population, data points that have the most diversity in one or more characteristics, etc. In this manner, the probability that the acquisition function selects data point(s) corresponding to new defect types may be increased. In other words, the acquisition function may be configured for defect discovery. By combining the merits of deep learning and active learning, the embodiments described herein can provide a systematic solution for defect discovery under different tool setups such as those described further herein. Furthermore, the embodiments described herein can be applied to jointly perform defect discovery and NEF/defect classifier training.

The embodiments described herein can advantageously reduce the time-to-entitlement (TTE), i.e., recipe setup and optimization time, of inspection tools. For example, given a "working" inspection recipe, the embodiments described herein can be used to adaptively train a NEF. In addition, defect discovery may be performed on the first specimen. Mode selection may also be performed on the initial few specimens. For example, the embodiments described herein can be used as a metric to decide which imaging mode(s) and recipe settings are the best for selected defect types. In particular, if the steps described herein are performed for different data sets generated with different imaging parameters and/or recipe settings, the results of the embodiments described herein can be used to identify which of the imaging parameters and/or recipe settings is better for inspection of the specimens (e.g., by comparing which defects were discovered or detectable using the different imaging modes and/or recipe settings, which may be reflected in the labels acquired for the data points selected by the acquisition function, or by comparing the results produced by different defect classifiers trained by the embodiments described herein, where the embodiments may train multiple defect classifiers, one for each of the different data sets input to the embodiments, the multiple defect classifiers may include the same defect classifier or different types of defect classifiers, and the results are the number of each type of DOI produced by the trained defect classifiers). For example, the embodiments described herein can be used to identify the imaging mode and/or recipe parameters that detected the most types of DOI and/or produced the largest number of DOIs correctly classified by the trained defect classifier(s). The embodiments described herein can also be used for continuous learning and monitoring on a few (or multiple) specimens. The embodiments permit NEF learning and recipe learning on multiple specimens by aggregating the labeled defects and collecting unlabeled samples from each specimen.

In a further embodiment, the system includes an additional imaging subsystem configured to generate additional images for the specimen, and the computer subsystem(s) are configured for performing hybrid inspection by detecting defects on the specimen using the images generated by the imaging subsystem and the additional images generated by the additional imaging subsystem. For example, the hybrid inspector concept essentially combines different tools in a single inspection process performed on a single specimen. Hybrid inspection may be performed by the embodiments described herein as described in U.S. Pat. No. 9,916,965 by Bhaskar et al. issued on Mar. 13, 2018 and U.S. Pat. No. 9,222,895 by Duffy et al. issued Dec. 29, 2015 and commonly assigned U.S. patent application Ser. No. 16/364,140 filed Mar. 25, 2019 by Bhaskar et al., which are incorporated by reference as if fully set forth herein. The embodiments described herein may be further configured as described in this patent and patent application.

One real challenge for semiconductor process control is that there tends to be no one tool that can identify all failure defect types. The embodiments described herein, however, provide a system to leverage the defect ground truth from other different tools (including SEM, x-ray tools, etc.), i.e., tools other than the inspection tool, to perform defect discovery and NEF training so as to enable automated and robust recipe setup and tuning. In addition, the embodiments can be applied to only a single inspection tool or a hybrid inspector (which combines two or more inspection tools). By combining the merits of deep learning and active learning, the embodiments described herein can provide a systematic solution for defect discovery and NEF training under different tool setups. The embodiments described herein can, therefore, especially improve recipe setup and tuning from both quality and time-cost metrics, which potentially will reduce the cost-of-ownership of inspection tools and increase the value of hybrid tools by enabling more complicated and advanced recipe tuning. In addition, the embodiments described herein provide a path to truly implement the hybrid inspector concept with deep learning to jointly leverage electron beam and optical inspection tools, which is the foundation of the hybrid inspector roadmap. The embodiments described herein can also be directly implemented on optical inspection tools and especially on hybrid inspection tools.

The embodiments described herein may therefore incorporate a Bayesian Deep Learning (BDL) framework and hybrid inspection into a single system or method. For example, BDL may provide enhanced defect sampling and adaptive model training on a hybrid inspector. In addition, the embodiments described herein can incorporate the active learning concept into the deep learning domain: by leveraging the hybrid inspector concept, e.g., on-the-fly electron beam image acquisition, this work establishes a systematic methodology to break the interdependency between model training and data discovery and provides a general solution for learning a deep model from extremely limited (or even no) labeled data points. In addition, incorporating Bayesian perspectives into the embodiments described herein provides tools for managing risks associated with data insufficiency and population imbalance. Experiments performed by the inventors on trivial and real wafer datasets have demonstrated the effectiveness of BDL on improving both defect sampling and classifier accuracy. Combining BDL with hybrid inspection can also address the sophisticated recipe setup and optimization for advanced inspection tools such as BBP inspection tools.

BDL is also effective for reducing the manual iterations between inspection and review due to the unified system-algorithm solutions described herein. In addition, BDL is effective for enhancing defect sampling efficiency due to active learning. Furthermore, BDL is effective for improving NEF performance due to deep learning. BDL can also be used to further address the optimization of other parameters in a recipe such as imaging mode and care area optimization. Moreover, the embodiments described herein provide a foundation for bringing deep learning methodologies into the process control arena, which is dramatically different compared to natural image processing applications. Another possible unique application for BDL is to jointly setup inspection and review tools for an unseen (new) layer simultaneously. Traditionally, this is also a "chicken-egg" problem due to the limitations of each tool. BDL can actually unite this interdependency by applying the core active learning concept. As the BDL is established on a substantially firm theoretical foundation, it is not difficult to imagine that BDL can become an efficient tool for addressing the joint sampling and learning problems on several other tool lines. For example, although some embodiments are described herein specifically with respect to inspection or inspection tools, the embodiments described herein can be used to address the joint sampling and learning problems on other tools lines such as metrology tools, defect review tools, and the like.

In one such embodiment, one of the imaging and additional imaging subsystems is configured as an optical imaging subsystem, and the other of the imaging and additional imaging subsystems is configured as an electron beam imaging subsystem. For example, the imaging subsystem may be an optical imaging subsystem included in an inspection tool such as a BBP inspection tool, and the additional imaging subsystem may be another inspection and/or review tool that may be electron beam based. The imaging and additional imaging subsystems may be further configured as described herein and shown in FIGS. 1 and 1*a*.

The embodiments described herein have a number of advantages over previously used systems and methods for sampling. For example, the embodiments described herein have better performance over any currently used solutions in a number of different ways. In one such example, the embodiments can work with substantially limited labeled data (e.g., one labeled data point per defect class). The embodiments described herein are particularly suitable for use with substantially limited data sets (e.g., 1 or 2 DOIs per defect class) for a number of reasons such as that they can use a Bayesian approach, i.e., estimate the uncertainty, quickly bootstrap the learning process and can asymptotically, quickly converge to the optimal model. In another such example, the embodiments described herein can work with missing defect class(es) and discover it/them during the iterations. In an additional such example, the embodiments described herein can work with any model especially deep neural networks. In a further such example, the embodiments described herein can estimate the NEF prediction uncertainty. The advantages of predicting uncertainty include enabling the Bayesian active discovery. The Bayesian approach enables dealing with insufficient data scenarios and missing data scenarios more reliably. Another advantage of predicting uncertainty includes allowing the acquisition function to deal with ambiguous data and unseen data as explained further herein. Additional examples of the advantages of the embodiments described herein are described further herein.

The embodiments described herein may be further configured as described in "Deep Bayesian Active Learning with Image Data," Gal et al., arXiv:1703.02910v1, Mar. 8, 2017, 10 pages, which is incorporated by reference as if fully set forth herein.

Each of the embodiments of each of the systems described above may be combined together into one single embodiment.

Another embodiment relates to a computer-implemented method for performing active learning for training a defect classifier. The method includes performing active learning for training a defect classifier. The active learning includes the applying, acquiring, and generating steps described above. The method also includes the training step described above. The defect classifier is configured as described further herein. Performing the active learning and training the defect classifier are performed by one or more computer subsystems, which may be configured as described further herein.

Each of the steps of the method may be performed as described further herein. The method may also include any other step(s) described herein. The computer subsystem(s)

may be configured according to any of the embodiments described herein, e.g., computer subsystem(s) 102. In addition, the method described above may be performed by any of the system embodiments described herein.

Figure 4:
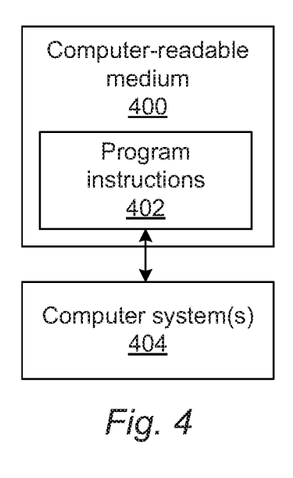
FIG. 4 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for performing active learning for training a defect classifier. One such embodiment is shown in FIG. 4. In particular, as shown in FIG. 4, non-transitory computer-readable medium 400 includes program instructions 402 executable on computer system(s) 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 404 may be configured according to any of the embodiments described herein.

Further modifications and alternative embodiments of various aspects of the invention will be apparent to those skilled in the art in view of this description. For example, methods and systems for performing active learning for training a defect classifier are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to perform active learning for training a defect classifier, comprising:
   an imaging subsystem comprising at least an energy source and a detector, wherein the energy source is configured to generate energy that is directed to a specimen, and wherein the detector is configured to detect energy from the specimen and to generate images responsive to the detected energy; and
   one or more computer subsystems configured for performing active learning for training a defect classifier, wherein the active learning comprises:
      applying an acquisition function to data points for the specimen, wherein the acquisition function selects one or more of the data points based on uncertainty estimations associated with the data points, and wherein the data points for the specimen to which the acquisition function is applied comprise a combination of fewer than ten ground truth data points for any one defect type and unlabeled data;
      acquiring labels for the selected one or more data points; and
      generating a set of labeled data comprising the selected one or more data points and the acquired labels; and
   wherein the one or more computer subsystems are further configured for training the defect classifier using the set of labeled data, and wherein the defect classifier is configured for classifying defects detected on the specimen using the images generated by the imaging subsystem.

2. The system of claim 1, wherein the active learning further comprises repeating at least once a sequence of steps comprising the applying, the acquiring, and the generating steps, and wherein the generating step performed in the sequence of steps comprises appending the labels acquired for the one or more data points selected in the applying step performed in the sequence of steps to the set of labeled data.

3. The system of claim 1, wherein the acquisition function is defined as an unsupervised sampling method.

4. The system of claim 1, wherein the acquisition function is defined as a supervised sampling method.

5. The system of claim 1, wherein the acquisition function is defined as a semi-supervised sampling method.

6. The system of claim 1, wherein the acquisition function is defined as a combination of a supervised and unsupervised sampling method.

7. The system of claim 1, wherein the acquisition function is defined as a sampling method based on Maximum Entropy.

8. The system of claim 1, wherein the acquisition function is defined as a sampling method based on Bayesian Active Learning.

9. The sys of claim 1, wherein the acquisition function is defined as an Error Reduction method.

10. The system of claim 1, wherein the acquisition function is defined as a Variance Reduction method.

11. The system of claim 1, wherein the acquisition function is defined as a deep learning model.

12. The sys of claim 1, wherein the acquisition function is defined as a machine learning model.

13. The system of claim 1, wherein applying the acquisition function comprises estimating the acquisition function by evaluating one or more probability distributions using a Bayesian learning model.

14. The system of claim 13, wherein the Bayesian learning model is a Bayesian deep learning model.

15. The system of claim 13, wherein the Bayesian learning model is a Bayesian machine learning model.

16. The system of claim 13, wherein the one or more probability distributions comprise an unsupervised estimation of sample probability of one or more of the images generated by the imaging subsystem.

17. The system of claim 13, Wherein the one or more probability distributions comprise a supervised or semi-supervised estimation of model posterior and its derived uncertainty distribution.

18. The system of claim 1, wherein acquiring the labels comprises classifying the selected one or more data points using a ground truth method.

19. The system of claim 1, wherein acquiring the labels comprises classifying the selected one or more data points through human input.

20. The system of claim 1, wherein acquiring the labels comprises classifying the selected one or more data points through a crowd sourcing method.

21. The system of claim 1, wherein acquiring the labels comprises classifying the selected one or more data points through physics simulation.

22. The system of claim 1, wherein the defect classifier is further configured as a nuisance event filter.

23. The system of claim 1, wherein the defect classifier is further configured as a defect detector.

24. The system claim 1, wherein the defect classifier is further configured as an automatic defect classifier.

25. The system of claim 1, wherein the defect classifier is further configured as a multi-class classifier.

26. The system of claim 1, wherein the acquisition function is configured to select the one or more of the data points that have the highest probability of being new defect types.

27. The system of claim 1, wherein the acquisition function is configured to select the one or more of the data points that have the highest uncertainty of being any known defect type.

28. The system of claim 1, wherein the imaging subsystem is configured as an optical inspection subsystem.

29. The system of claim 1, wherein the imaging subsystem is configured as an electron beam inspection subsystem.

30. The system of claim 1, wherein the imaging subsystem is configured as an electron beam defect review subsystem.

31. The system of claim 1, further comprising an additional imaging subsystem configured to generate additional images for the specimen, wherein the one or more computer subsystems are further configured for performing hybrid inspection by detecting defects on the specimen using the images generated by the imaging subsystem and the additional images generated by the additional imaging subsystem.

32. The system of claim 31, wherein one of the imaging and additional imaging subsystems is configured as an optical imaging subsystem, and wherein the other of the imaging and additional imaging subsystems is configured as an electron beam imaging subsystem.

33. The system claim 1, wherein the specimen comprises a wafer.

34. The system of claim 1, wherein the specimen comprises a reticle.

35. A non-transitory computer-readable medium, storing program instructions executable on one or more computer systems for performing a computer-implemented method for performing active learning for training a defect classifier, wherein the computer-implemented method comprises:
  performing active learning for training a defect classifier, wherein the active learning comprises:
    applying an acquisition function to data points for a specimen, wherein the acquisition function selects one or more of the data points based on uncertainty estimations associated with the data points, and wherein the data points for the specimen to which the acquisition function is applied comprise a combination of fewer than ten ground truth data points for any one defect type and unlabeled data;
    acquiring labels for the selected one or more data points; and
    generating a set of labeled data comprising the selected one or more data points and the acquired labels; and
  training the defect classifier using the set of labeled data, wherein the defect classifier is configured for classifying defects detected on the specimen using images generated for the specimen by an imaging subsystem.

36. A computer-implemented method for performing active learning for training a defect classifier, comprising:
  performing active learning for training a defect classifier, wherein the active learning comprises:
    applying an acquisition function to data points for a specimen, wherein the acquisition function selects one or more of the data points based on uncertainty estimations associated with the data points, and wherein the data points for the specimen to which the acquisition function is applied comprise a combination of fewer than ten ground truth data points for any one defect type and unlabeled data;
    acquiring labels for the selected one or more data points; and
    generating a set of labeled data comprising the selected one or more data points and the acquired labels; and
  training the defect classifier using the set of labeled data, wherein the defect classifier is configured for classifying detects detected on the specimen using images generated for the specimen by an imaging subsystem, and wherein performing the active learning and training the defect classifier are performed by one or more computer subsystems.

* * * * *